United States Patent [19]
Desrosiers et al.

[11] Patent Number: 5,463,574
[45] Date of Patent: Oct. 31, 1995

[54] APPARATUS FOR ARGUMENT REDUCTION IN EXPONENTIAL COMPUTATIONS OF IEEE STANDARD FLOATING-POINT NUMBERS

[75] Inventors: Bernard Desrosiers, Boissise Le Roi; Didier Louis, Fontainebleau; Didier Pinchon, Les Ulis; Andre Steimle, Evry, all of France

[73] Assignee: International Business Machines Corporation, Armonk, N.Y.

[21] Appl. No.: 99,119

[22] Filed: Jul. 29, 1993

[30] Foreign Application Priority Data

Nov. 5, 1992 [EP] European Pat. Off. .............. 92480165

[51] Int. Cl.$^6$ ..................................................... G06F 7/38
[52] U.S. Cl. ......................................... 364/748; 364/736
[58] Field of Search ........................... 364/715.01, 718, 364/719, 720, 721, 722, 729, 735, 736, 748

[56] References Cited

U.S. PATENT DOCUMENTS

| | | | |
|---|---|---|---|
| 4,484,259 | 11/1984 | Palmer et al. | 364/736 X |
| 4,777,613 | 10/1988 | Shahan et al. | 364/748 |
| 4,956,799 | 9/1990 | Nakayama | 364/729 |
| 5,042,001 | 8/1991 | Brightman et al. | 364/736 |
| 5,235,535 | 8/1993 | Nakayama | 364/735 X |

OTHER PUBLICATIONS

Tang, "Table–Lookup Algorithms for Elementary Functions and Their Error Analysis", Proceedings 10th IEEE symposium on Computer Arithmetic, pp. 232–236, 1991.

"Vriable–Precision Exponentiation" by P. L. Richman Communications of the Association for Computing Machinery, vol. 16, No. 1, Jan. 1973, New York, N.Y., pp. 38–40.

"Floating–point uP Implements High–Speed Math Functions" by David Quong, EDN Electrical Design News, vol. 31, No. 3, Feb. 1986, Newton, Mass., pp. 143–150.

*Primary Examiner*—Roy N. Envall, Jr.
*Assistant Examiner*—Chuong D. Ngo
*Attorney, Agent, or Firm*—John J. Timar; Edward H. Duffield

[57] ABSTRACT

An apparatus for executing argument reduction in the computation of $F(x)=2^{**}x-1$ (with $|x|<1$), determining the value of xi and computing (x-xi) according to the IEEE 754 standard floating-point format having a first circuit arrangement operative to perform pipeline operations on a N bit mantissa; the output of the first circuit arrangement being connected to a normalizer circuit of N+4 bits whose three left-most inputs are tied to "zero" and whose three left-most out bits $J(0:2)$ are output on a three-bits bus (J-BUS). Also incorporated is a leading zero detector/encoder circuit and a second circuit arrangement operative to perform pipeline operations on exponents connected to an encoder circuit whose output controls the aligner circuit and a selector circuit driven by the outputs of the detector/encoder circuit and encoder circuit whose output controls the normalizer circuit; a xi determining circuit that generates the xi mantissa on a xi-BUS connected to the first circuit arrangement such that: mantissa xi=0=K(1) K(2) 1 0 . . . , 0, and a read-only memory to store the F(xi) values whose output is connected to inputs of the first and second circuits for the respective mantissa and exponent parts of F(xi).

3 Claims, 11 Drawing Sheets sign(xi) = sign(x)

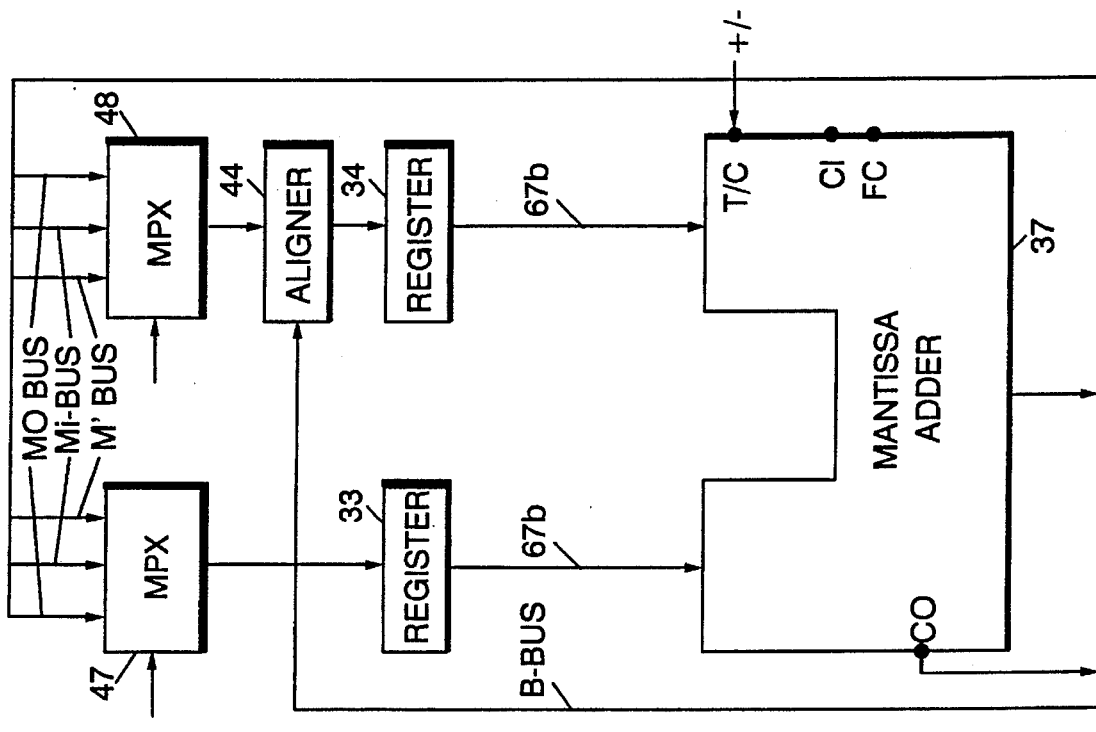
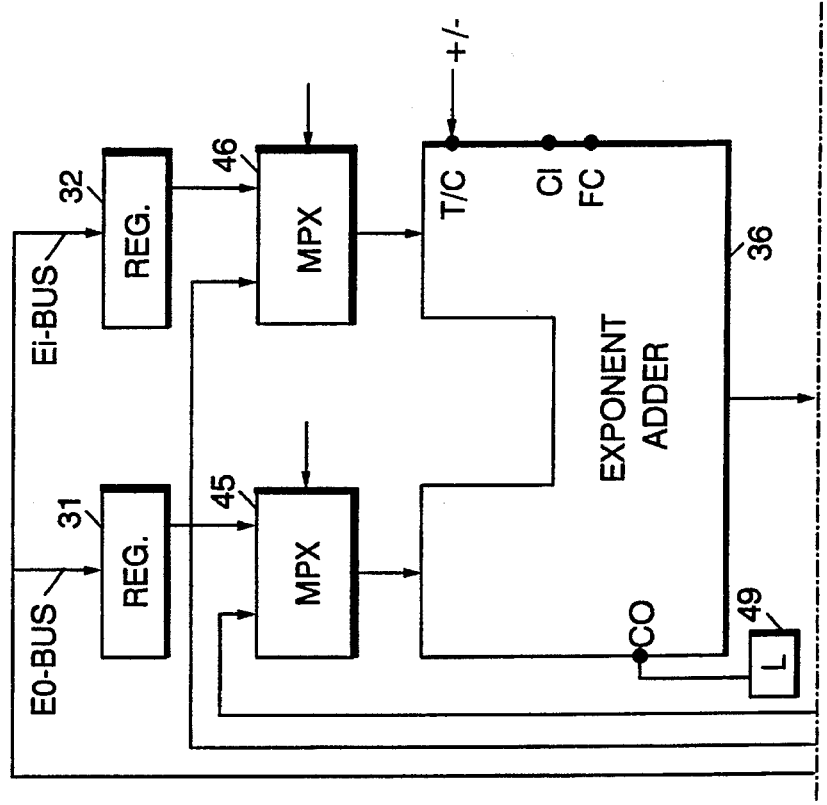
FIG. 5A
FIG. 5 PRIOR ART
| FIG. 5A |
| FIG. 5B |

| FIG. 8A |
|---|
| FIG. 8B |

1

APPARATUS FOR ARGUMENT REDUCTION IN EXPONENTIAL COMPUTATIONS OF IEEE STANDARD FLOATING-POINT NUMBERS

FIELD OF THE INVENTION

The present invention relates to numerical data processors and more particularly to an apparatus for executing the argument reduction step that is extensively used in exponential and logarithm computations for IEEE standard representations of floating-point numbers.

PRIOR ART

In order to provide greater computing power for those applications requiring significant numbers of floating-point operations, numerical data processors generally implement the essential elementary floating-point instructions, such as addition, subtraction, multiplication and division, in hardware. Most commonly, these floating-point instructions are directly integrated into either the data processor semiconductor chip or in a separate numerical data processor chip, such as a so-called mathematical or numeric coprocessor which cooperates with the main data processor to execute the floating-point instructions. Transcendental functions including exponential, logarithmic and trigonometric functions necessary to scientific computations are not as frequently used as these elementary functions, and because they are really hardware consuming, their computations are generally performed by software techniques.

Numerical values or data used in scientific or technical calculations are expressed in a floating-point number configuration consisting of a sign S, an exponent E and a mantissa M, which permits the expression of a wide range of numerical values in a limited number of bits. There are a number of different standard formats to implement this configuration. In particular, a typical widely accepted floating-point format is the IEEE 745 standard format proposed by the Institute of Electrical and Electronics Engineers (IEEE). This standard defines four floating-point formats: single, single extended, double and double extended precision.

For the sake of illustration, only the 80-bit double extended, precision format will be discussed below because this format is extensively used in microcomputer chips. As illustrated in FIG. 1, it consists of a 1-bit sign, a 15-bit exponent and a 64-bit significand. In this format, at location 63, an explicit 1 is stored in the significant part of the format, except for some values such as zero. The remaining 63-bit part of the significand is so-called the mantissa M. In addition, the exponent is expressed in a biased form, i.e. a constant referred to as BIAS=16383 is added to the real value E of the exponent (true exponent). With the format of FIG. 1, 64 mantissa bits of precision are obtained, one can therefore represent a number within the range of $-2^{16382}$ (the greatest negative number) and $+2^{16383}$ (the greatest positive number).

More generally, according to the IEEE standard format, the value of a real number N is given by $$N=((-1)^{**}S)^*(1.M)^*(2^{**}(E+BIAS))$$

wherein S=0 for a positive number and S=1 for a negative number.

A valid (or normalized) number N is given by 0<E+BIAS<32767. The case in which the value of the biased exponent is at its maximum (i.e. E+BIAS=32767) and the mantissa M different from 0, is specially treated as a non-number. The case in which the value of the biased exponent is at its maximum and the mantissa M equals to 0, is specially treated as infinity. Finally, the case in which the value of the biased exponent E+BIAS is at its minimum, (i.e. equals to 0) is exceptionally treated as a denormalized number (M±0) or zero (M=0).

Computations are made on 67 bit mantissas, then rounded on 64 bits depending on the three last bits, referred to as the three precision extra-bits (sticky, guard, and rounding bit) as illustrated in FIG. 1. The IEEE standard describes three rounding modes. For example, according to the most frequently used rounding mode, a number whose 64 positions of the significand are filled with one's and the three precision bits are 100, the rounding operation consists in adding a 1 to the LSB of the significand. For further details, please refer to "A Proposed Standard for Binary Floating-Point Arithmetic", Draft 8.0 of IEEE Task P754, 1981 which is the reference document in that matter.

Now turning to the transcendental functions implying IEEE standard numbers, and more particularly to the exponential function, any evaluation algorithm in the (−1, +1) range must meet the two following basic requirements:

fast convergence, i.e. to require the lowest number of cycles per instruction; and, good accuracy, to achieve the expected minimum relative error. For instance, such as $<2^{**}-63$ with the above mentioned IEEE standard format illustrated in FIG. 1, which corresponds to an error on the last bit of the mantissa.

Thus, the algorithm choice is of paramount importance. Consequently, different algorithms have been examined by scientists, depending upon the available hardware architecture.

For floating point coprocessors not including a multiplier such, as the INTEL 80387 chip, the Cordic algorithm based method has been implemented to evaluate the exponential function because it is an iterative approximation that only uses add and shift operations. The Cordic method approximately requires a number of iterations equal to the number of mantissa bits (67 bits for the INTEL 80387 chip) thus, it is a relatively slow process.

For semiconductor chips, such as the CYRIX 83D87 chip, having a multiplier embedded therein, three different approaches for evaluating the exponential function have been investigated:

pure polynomial evaluation based on Taylor/Maclaurin or Chebyshev polynomials;

rational polynomial approximation according to the Padeh method; and, argument reduction followed by both polynomial evaluation and table correction.

According to previous theoretical works, see in particular student thesis: "Implementation des fonctions transcendantales" by Ph. Bonnot—ENST Paris February 1988, it has been demonstrated the last approach is well suited to the state of the art hardware architectures. It does not lead to the fastest approximation, but is quite satisfactory when the datapath has finite precision hardware (the length of the mantissa being a characteristic of internal registers).

Usually, to evaluate the exponential polynomial $e^{}x$, the starting function is $F(x)=(2^{}x)-1=(e^{**}(ln2^*x))-1$. In essence the method basically consists first in the determination of the optimized reduced range (x-xi). Once the reduced range has been selected, the polynomial evaluation of the exponential function within the reduced range i.e. F(x-xi)=(2(x-xi))-1 is performed. Finally, the result needs to be corrected to determine the final desired value F(x)= (2x)-1. This final correction step is based on F(x) which can be expressed as a function of F(x-xi) and F(xi). A correction table where the values of F(xi) corresponding to the values of xi within the whole range (-1,+1) is therefore required.

Explicit from Ph. Bonnot's contribution, the following TABLE I illustrates the minimum degree of Taylor/Maclaurin and Chebyshev polynomials to reach the relative error of less than 2**-63 mentioned above depending upon the selected reduced range. Likewise, in TABLE I, there is indicated for each of said reduced ranges, the number of F(xi) values that are required. These constant values F(xi) are necessary for the correction. They have to be stored internally, for instance in an on-chip ROM, so-called hereafter the constant ROM.

TABLE I

| Range | Taylor/Maclaurin | Chebyshev | Number of xi/F(xi) |
|---|---|---|---|
| (-1,+1) | 18 | 16 | 0 |
| (-1/2,+1/2) | 15 | 13 | 2 |
| (-1/4,+1/4) | 13 | 11 | 4 |
| (-1/8,+1/8) | 11 | 10 | 8 |
| (-1/16,+1/16) | 10 | 9 | 16 |
| (-1/32,+1/32) | 9 | 8 | 32 |
| (-1/64,+1/64) | 8 | 7 | 64 |

TABLE I clearly demonstrates from a theoretical point of view, that an argument reduction is recommended, because the narrower the range, the lower the polynomial degree, then the number of iterations and finally the number of machine cycles. But, this is at the cost of an increase of the number of the F(xi) values to be internally stored in the on-chip ROM, so that a trade-off has to be made between the table size and the number of iterations, to optimize the silicon room consumed. As a matter of fact, argument reduction is the essence of the exponential evaluation method.

In addition to the selection of a reduced range, the set of xi values within the (-1,+1) range must also be correctly chosen keeping in mind two contradictory requirements. On the one hand, best Chebyshev polynomial convergence is obtained by a nonlinear distribution. On the other hand, the fastest xi search is reached by linear distribution. Moreover, this search is obviously improved when the number of xi is a power of 2. Still pursuant to Ph. Bonnot's works, the linear distribution combined with number of xi being a power of 2 is thus recommended to define the xi values, since it is the easiest one to be implemented in the semiconductor chip. Taylor/Maclaurin and Chebyshev polynomial degree decreases from 18 to 11 and from 16 to 10 respectively with only 8 values in the table stored in the constant ROM. After, each new degree lowering doubles table size. Finally, within the (-1,+1) range, the eight xi values are defined by the following relation:

for $(k-1)/4 < |x| = < k/4$ with k an integer such as $1 \leq k \leq 4$ then $|xi| = (k-1)/4 + 1/8$ FIG. 2 illustrates the eight selected constant xi values in this example.

FIG. 3 of the present application shows the basic algorithm referenced 10 disclosed in Ph. Bonnot's thesis, that can use either Taylor/Maclaurin or Chebyshev polynomial evaluations for the exponential computation of F(x)= (2**x)-1 within the -1<x<1 range when adapted to the selected (-1/8,-1/8) reduced range.

As illustrated in FIG. 3, schematically, the exponential function evaluation method comprises three major stages: (1) argument reduction of the starting argument x which essentially consists in the determination of the appropriate xi value which subsequently will allow to reducing the range to |x-xi|, i.e. within the (-1/8, +1/8) range in the present case; (2) approximation of the polynomial using the reduced argument (x-xi) to generate an intermediate result F(x-xi); and, (3) correction of the intermediate result to obtain the desired final value F(x).

Still referring to FIG. 3, let us see in more detail the subject algorithm referenced 10. First the starting argument value x is tested in box 11. Note that, the algorithm is adapted only for values such that $|x| \leq 1$. If so, a new test is completed in box 12 as to determine whether |x|21 2-3 or not. If |x|<2-3, no argument reduction is required. On the contrary, the algorithm includes a two step argument reduction in boxes 13 and 14. In box 13, the key step of determining the xi value, which is the closest to the starting argument x is completed. In box 14, the (x-xi) value is computed. This ends the first stage referred to as the argument reduction stage. In box 15, a new test is performed. If x-xi=0, then F(x)=F(xi) as apparent from box 16, the sought value is directly available in the F(xi) correction table stored in the constant ROM. If x-xi ≠0, the value is tested again in box 17. If x-xi< 2**-66, then F(x-xi) can be approximated to (x-xi)*ln2 (box 18A) else the full polynomial computation is required (box 18B). This ends the polynomial evaluation stage or approximation stage.

Now the last stage of correction takes place. Several mathematical relations exist between F(xi), F(x-xi) and F(x), in particular the two following are of interest:

$$F(x)=(F(x-xi)*F(xi))-1 \quad (1)$$

$$F(x)=F(x-xi)+F(xi)+F(x-xi)*F(xi) \quad (2)$$

in other words, $$(2x)-1=((2(x-xi))-1)*((2**xi)-1)-1 \quad (1)'$$

$$(2x)-1=((2(x-xi))-1)+((2xi)-1)+(((2(x-xi))-1)*((2**xi)-1)) \quad (2)'$$

The second relation (2) or (2') which avoids errors when operands are close to each other is preferred, since the error performed with the first relation (1) or (1') goes far beyond the expected relative error (<2**-63).

The first member of relation (2) is computed in box 19, i.e. A=F(xi)+F(x-xi), then, the second member i.e. B=F(x-xi)*F(xi) is computed in box 20. The two members are summed in box 21, so that finally F(x)=A+B.

When |x|<2-3 and |x|≥2-66, as apparent in box 22 from the right-most part of algorithm 10, the exponential polynomial function is evaluated in box 23A with no argument reduction to avoid subtracting two very close numbers.

When argument x is less than 2**-66, the exponential function is evaluated in box 23B by only the first term of Taylor/Maclaurin series, i.e. F(x)=x*ln2.

Now arises the question of determining whether the Taylor/Maclaurin or the Chebyshev polynomial evaluation is the more adequate, because the number of cycles to approximate the exponential function within the (-1,+1)

range is also of importance. As apparent from TABLE I, Chebyshev polynomial evaluation appears slightly more efficient in polynomial degree reduction, and thus leads to one iteration less and in turn to less machine cycles. This point is demonstrated by TABLE II below which shows a simulation of the number of cycles that are necessary with a conventional hardware architecture.

TABLE II

| Taylor/Maclaurin | Chebyshev |
|---|---|
| 120 | 111 |

As a final result, there is a significant advantage for the Chebyshev polynomials. Accordingly, the Tchebitchev polynomials will be preferred in all respects to the Taylor/Maclaurin polynomials.

An exponential polynomial is neither an even nor an odd function, which means none of its coefficients equals zero except A0. So the number of iterations does square with the degree of the polynomial. Argument reduction looks interesting as soon as the number of machine cycles needed by both argument reduction and table correction is far from overshooting the number of iterations that would be required, should no argument reduction be performed.

The magnitude of the permitted error ($<2^{}-63$) directly affects the degree of the polynomial, and in turn the number of iterations required to evaluate it under the well known Horner scheme. With the above choices, the 10th degree of the polynomial meets the expected relative error ($<2^{}-63$) within the $(-\frac{1}{8}, \frac{1}{8})$ range.

Finally, for completeness of this introduction, FIG. 4 shows the specific algorithm referenced 24 which is disclosed by Ph. Bonnot in his thesis. This specific algorithm is to be used in box 13 of the FIG. 3 algorithm, to determine the appropriate xi value to be later used in the computation of the reduced argument (x-xi).

Now turning to FIG. 4, in box 25, term C=|x|-½ is determined. In box 26, C is tested. If C≧0, term D=C-¼ is computed in box 27B. Next D is tested in box 28B to determine if it is a positive or a negative number, If D≧0, then in box 29B', the appropriate xi value is found such as |xi|=⅞. Similar reasoning applies to the determination of other possible |xi| values: ⅛, ⅜ and ⅝ respectively in boxes 29A, 29A' and 29B.

Broadly in accordance with Ph. Bonnot's conclusions, the preferred way to evaluate the exponential function requires the three major stages of the FIG. 3 algorithm:

reduce argument range from (−1,+1) to (−⅛, +⅛) using the specific algorithm of FIG. 4 and determine the appropriate xi value to speed up convergence, calculate Chebyshev polynomial approximation within this reduced argument range; and, perform specific correction according to relation (2), i.e. F(x) =(F(x-xi)*F(xi))+F(x-xi)+F(xi) where F(x) equals ($2^{**}x$)−1. All F(xi) values of the correction table are stored in the constant ROM.

In this context, the present invention aims to solve two problems. First of all, to implement a specific algorithm or process for the argument reduction that is much more effective than the algorithm of FIG. 4 in terms of fast convergence and correction table size.

The second problem to be solved is to adapt the high performance hardware architecture for achieving ADD/SUBTRACT operations described in copending application EP 91480188.1 filed on 20 Dec. 1991 and assigned to the present assignee, to the exponential evaluation with the minimum circuitry changes.

This (unpublished) hardware architecture will be now briefly described in conjunction with FIG. 5. Now turning to FIG. 5, there is schematically shown the block diagram of the improved apparatus 30 for the hardware implementation of the elementary ADD/SUBTRACT compare operations pursuant to the IEEE 80-bit double extended precision format of FIG. 1. Note that, for sake of simplicity, the control logic circuits and control lines including the clock signals have been omitted.

Exponents and mantissas for operands X and Y are separately stored in different input registers. Originally, exponents of operands X and Y, respectively EX and EY, are stored in input registers 31 and 32. Likewise, mantissas of operands X and Y, respectively MX and MY, are stored in input registers 33 and 34. Operands X and Y are sequentially, or preferably simultaneously, extracted from two zones of a stack register, referenced 35, e.g. respectively at addresses 0 and i (i=1 to 7). Stack register 35 is of the two-port READ and one-port WRITE type. The E-BUS and M-BUS are dual data busses that, respectively, convey the exponent and mantissa data out of the stack 35. For example, sub-busses E0 and M0 respectively convey the exponent and mantissa of operand X stored in the stack at address 0 to their respective input registers 31 and 33. Sub-busses Ei and Mi, respectively, convey the exponent and mantissa of operand Y stored in the stack at address i to their respective input registers 32 and 34.

Addition/subtraction operations between operands X and Y is achieved in adders 36 and 37, respectively, for the exponents and the mantissas. Basically, adders are loaded by data contained in their respective input registers. Each adder includes one true/complement (T/C) input as explained hereafter. The data computed in the adders, i.e. the partial results of the ADD/SUBTRACT operation, are stored in two distinct output registers. The data is loaded in output register 38 from adder 36 for exponent data, and in output register 39 from adder 37 for the mantissa data. Output of register 38 is connected to exponent input of stack 35 via the E'-BUS. The output of register 39 is connected both to a normalizer circuit 40 and to a leading zero encoder circuit 41.

Whenever necessary, the mantissa stored in register 39 is arranged at the IEEE format in normalizer 40. The number of leading zeros of the mantissa stored in register 39 is first calculated, then encoded in encoder circuit 41, and finally, stored in a leading zero register 42. Said encoded number also controls normalizer 40 via control bus A-BUS. At the output of normalizer 40, the bus M'-BUS is applied to the mantissa input of stack 35. The output bus E'-BUS of register 38 is connected to encoder circuit 43, so that its content value is encoded therein. The output of circuit 43 is applied to aligner 44 via control bus B-BUS. Aligner 44 drives input register 34. The carry out bit c generated in mantissa adder 37 is connected to the 68th position of register 39.

Because, as mentioned above, a rounding operation of the mantissa result may be necessary, the output of register 38 is applied to the left input of exponent adder 36 via the E'-BUS and one input of the two-way multiplexer circuit 45, whose other input is fed by register 31. Similarly, the output of register 42 is applied to the right input of adder 36 via the D-BUS and the two-way multiplexer circuit 46 whose other input is fed by register 32.

As a matter of fact, each bit generated by register 32 is applied to one input of a XOR circuit (not represented) included in adder 36 as standard whose other input receives a control bit generated by the control logic which depends on the operation ADD or SUBTRACT to be completed. If the control bit is equal to 0, the bit is not complemented, this is the true input (T), otherwise the bit is complemented, this is said to be the complement input (C). For sake of simplicity, this control command is illustrated by the T/C input of adder 36.

As far as the mantissa adder is concerned, the M-BUS (including the MO-BUS and Mi-BUS) and the M'-BUS are applied to two three-way multiplexers 47 and 48 which, respectively, feed registers 33 and 34 either directly (for register 33) or via aligner 44 (for register 34). The exponent and mantissa of the result, after normalization and rounding, are stored in stack 35 via E'-BUS and M'-BUS busses, respectively. Latch 49 is used to store the carry out bit generated by the exponent adder 36. Stack 35 operates as a RAM where all binary operands and signs are stored. The sign is generated in the control logic and simultaneously stored in stack 35. The circuits for the sign processing are not shown.

Simulations conducted with the argument reduction algorithm of FIG. 4 and the improved hardware architecture of FIG. 5, once properly modified to that end, have evidenced some inconveniences. With the eight xi values, it is necessary to store two constant values (½ and ¼), i.e. two 80-bit numbers (with the IEEE standard format of FIG. 1) in the constant ROM. In addition, the full operation of exponential approximation requires nine steps as schematically illustrated in FIG. 6. These steps are not further detailed in the present application.

Therefore, because transcendental number computations would normally entail the problem of requiring a large amount of processing steps and thus, of a corresponding number of machine cycles, the algorithm at the base of these functions must not imply any significant modifications of the base hardware architecture that has been mainly designed to the processing of the elementary instructions (addition, subtraction, ...) in order to not degrade their performance. This is more particularly true for the argument reduction algorithm which is essential to the global evaluation method.

OBJECTS OF THE INVENTION

Therefore, it is a primary object of the present invention to provide an improved specific algorithm and an improved apparatus for executing the argument reduction of IEEE standard floating point format numbers and adequate for being incorporated in the high performance hardware architecture of FIG. 5 with a minimum of circuitry changes thereof.

It is another object of the present invention to provide an improved specific algorithm and an improved apparatus for executing the argument reduction between IEEE standard floating-point format numbers with a minimum number of processing steps and thus a minimum number of machines cycles.

BRIEF SUMMARY OF INVENTION

In accordance with the present invention, the described objects are achieved by means of an apparatus for executing the argument reduction stage in the computation of $F(x)=2^{**}x-1$ (with $|x|<1$), i.e. determining the value of xi and computing (x-xi) according to the IEEE 754 standard floating-point format comprising:

a) a first functional block operative to perform pipeline ADD/SUBTRACT compare operations on an N bits mantissa (e.g. N=64 mantissa bits+3 rounding precision bits according to the 80-bit double-extended precision IEEE 754 standard format) including aligner means and an N+1 bits output register whose most significant bit is the carry-out bit generated by the mantissa adder; the output of said first functional block is connected to:

b) a normalizer means of N+4 bits whose three left-most inputs are tied to "zero" and whose three left-most out bits $J(0:2)$ are output on a three-bit bus (J-BUS);

c) a leading zero detector/encoder means;

said apparatus further comprising:

d) a second functional block operative to perform pipeline operations on exponents connected to an encoder means whose output controls said aligner means;

e) a selector circuit driven by the outputs of said detector/encoder means and encoder means whose output controls said normalizer means; and, f) a xi determining circuit that calculates bits $K(1)$ and $K(2)$ from bits $J(0:2)$ such as:

$$K(1)=J(0) \text{ OR } J(1)$$

$$K(2)=J(0) \text{ OR } J(2)$$

and generates the xi mantissa on a xi-BUS connected to said first functional block such as:

$$\text{mantissa } xi=0 \; K(1) \; K(2) \; 10 \ldots 0.$$

The novel features believed to be characteristic of this invention are set forth in the appended claims. The invention itself, however, as well as other objects and advantages thereof, may best be understood by reference to the following detailed description of an illustrated preferred embodiment to be read in conjunction with the accompanying drawings.

BRIEF DESCRIPTION DRAWINGS

DETAILED DESCRIPTION OF PREFERRED EMBODIMENT

Figure 7:
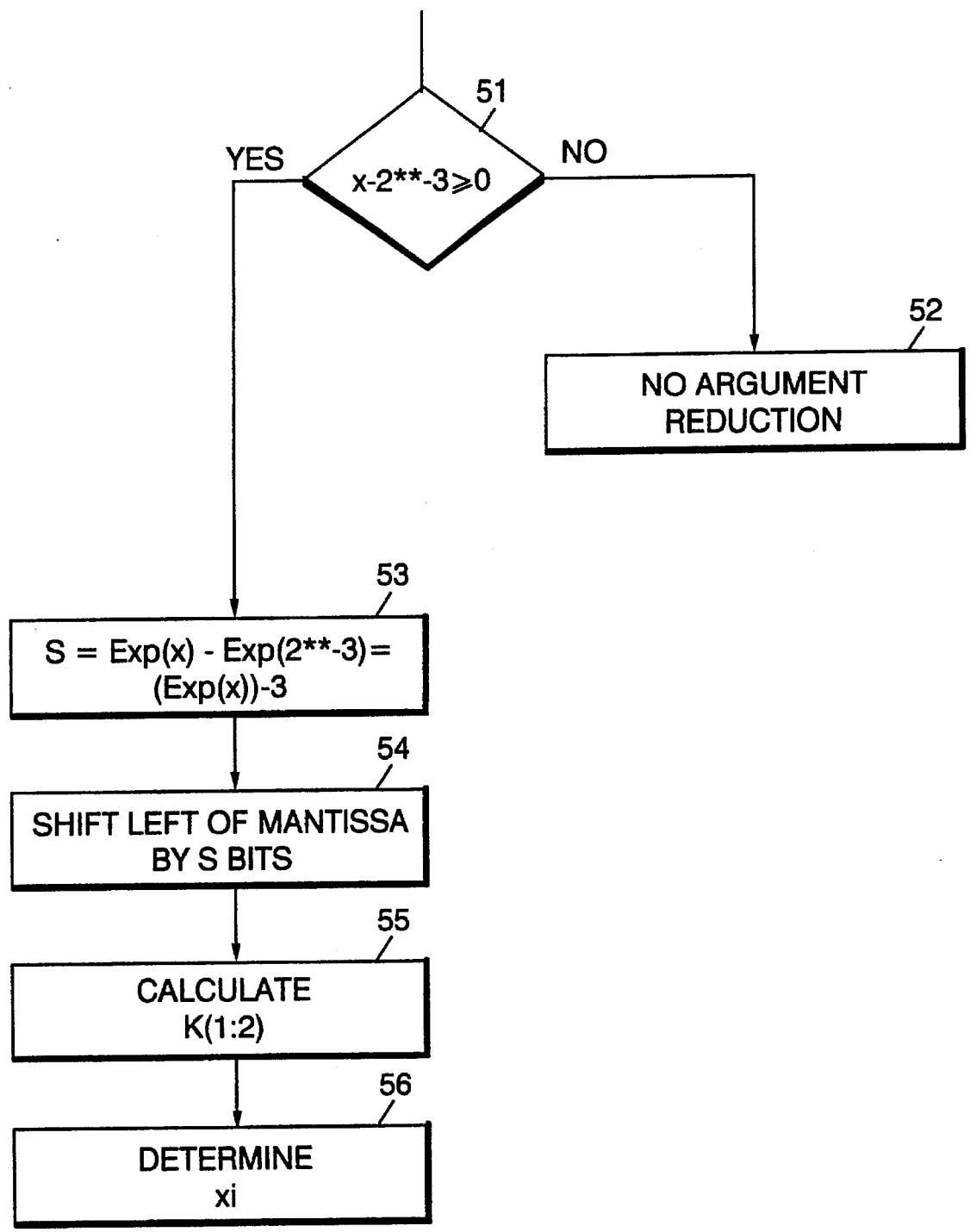
FIG. 7 shows the novel specific algorithm for determining the appropriate xi value according to the present invention.

The novel specific algorithm referenced 50 depicted in FIG. 7 is based on the discovery that all the information necessary to define the xi value is given by the three first left bits referred to as J(0:2) of the x mantissa. In box 51, one checks if x minus ⅛ is superior or equal to zero, because if not, no argument reduction is required as indicated by box 52. On the contrary, the operation S=Exp (x)–Exp (2–3)= (Exp(x))–3 is performed on the exponents only in box 53. This indicates the number of x mantissa bits that are required to evaluate xi. As the x range is (–1,+1), i.e. (–20, 2**0), the maximum value for S is thus 3. In other words, S may take one of four values: 0, 1, 2 or 3.

Next, the x mantissa is shifted left by this S value in box 54 to extract the adequate three J(0:2) bits that are necessary to define the appropriate xi value.

Now, the value of two bits referred to as K(1:2) is calculated in box 55 according to the following logic definitions:

$$K(1)=J(0) \text{ OR } J(1) \quad (3)$$

$$K(2)=J(0) \text{ OR } J(2) \quad (4)$$

When |x|=1, then J(0:2)=100, according to the present algorithm 50, xi=⅞. Thus, when J(0)=1, K(1) and K(2) must be forced to 1. It's the only time J(0) is used. Finally, in box 56, xi mantissa is defined as:

$$\text{xi mantissa}=0 \text{ } K(1) \text{ } K(2) \text{ } 10 \text{ - - - } 0 \text{ (67 bits).} \quad (5)$$

Figure 5B:
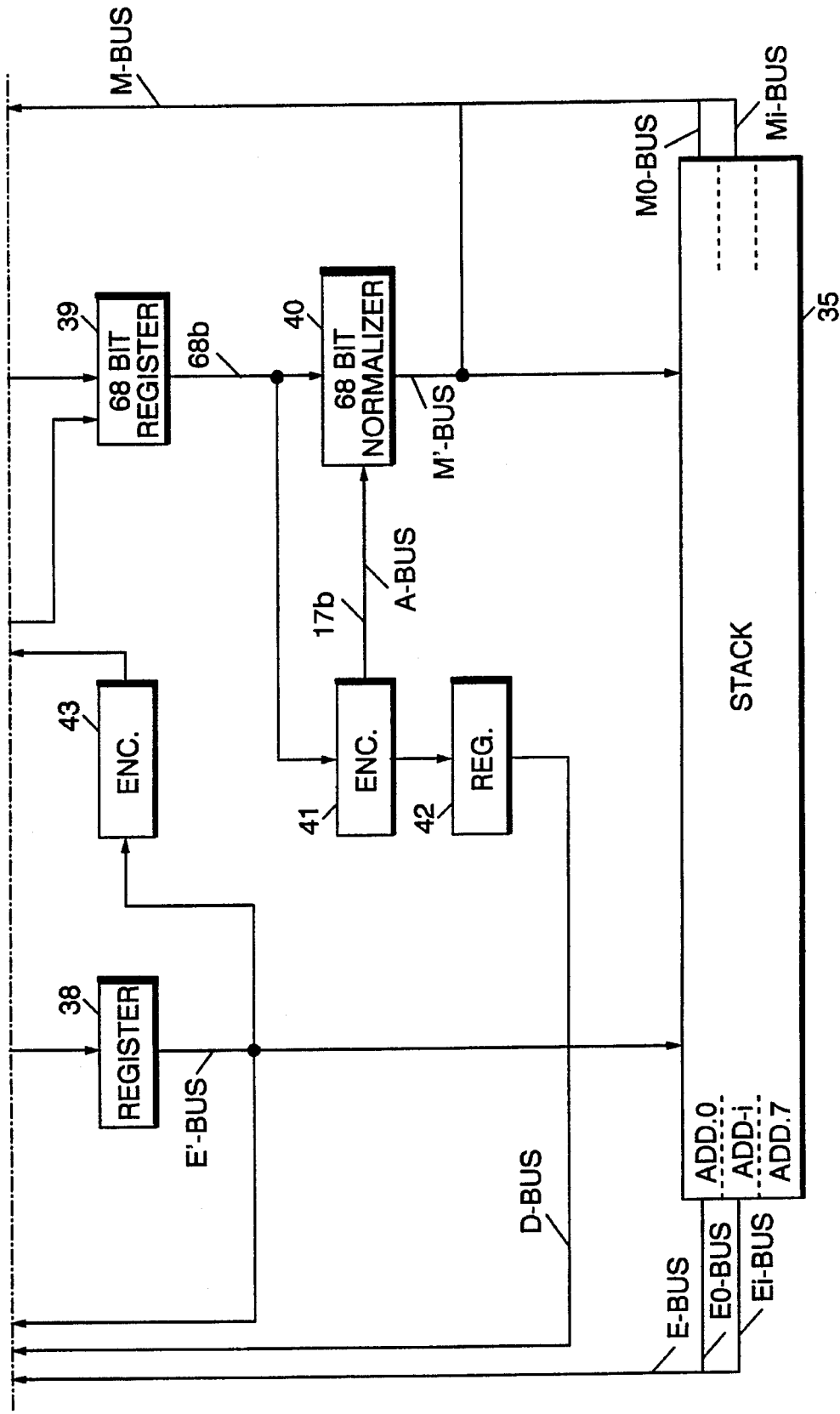
FIG. 5 shows the schematical block diagram of a conventional high performance apparatus for executing ADD/SUBTRACT operations of IEEE floating-point numbers using the particular IEEE standard format of FIG. 1.
Figure 6:
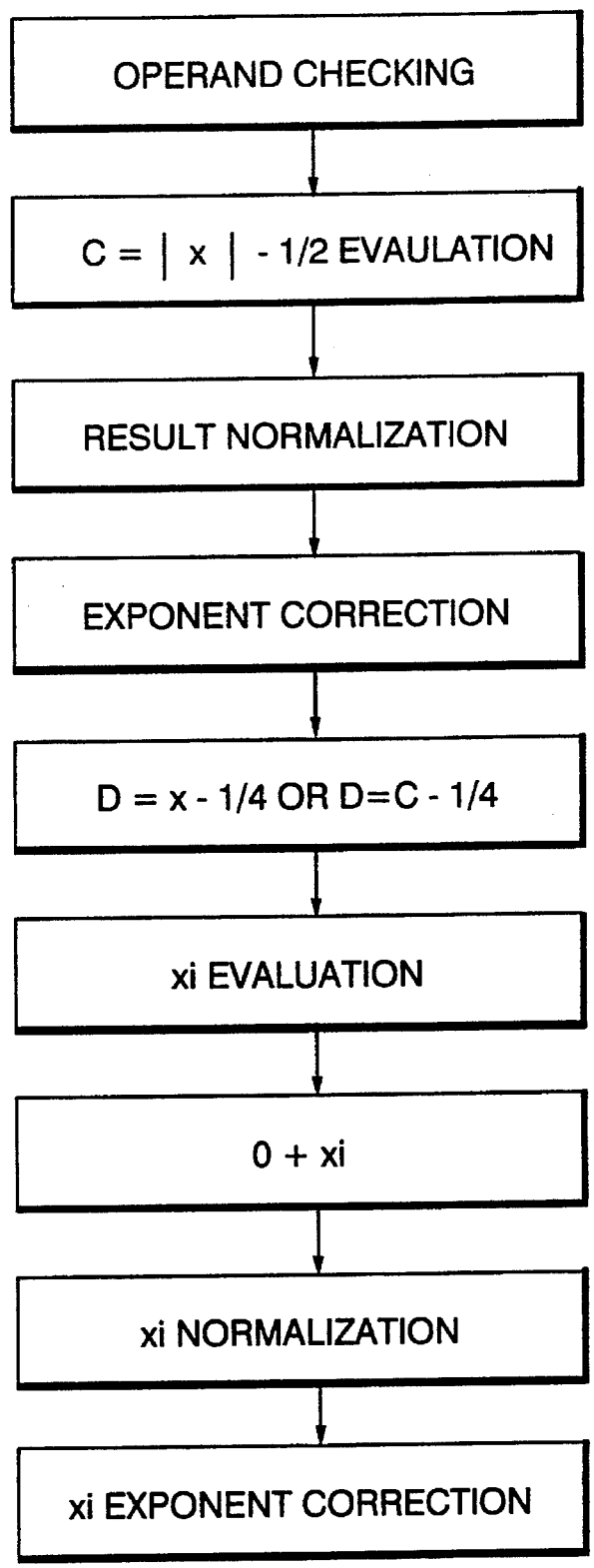
FIG. 6 illustrates the nine processing steps that are conventionally required to determine the xi values when using the apparatus of FIG. 5 and the specific algorithm of FIG. 4.
Figures 8, 8A:
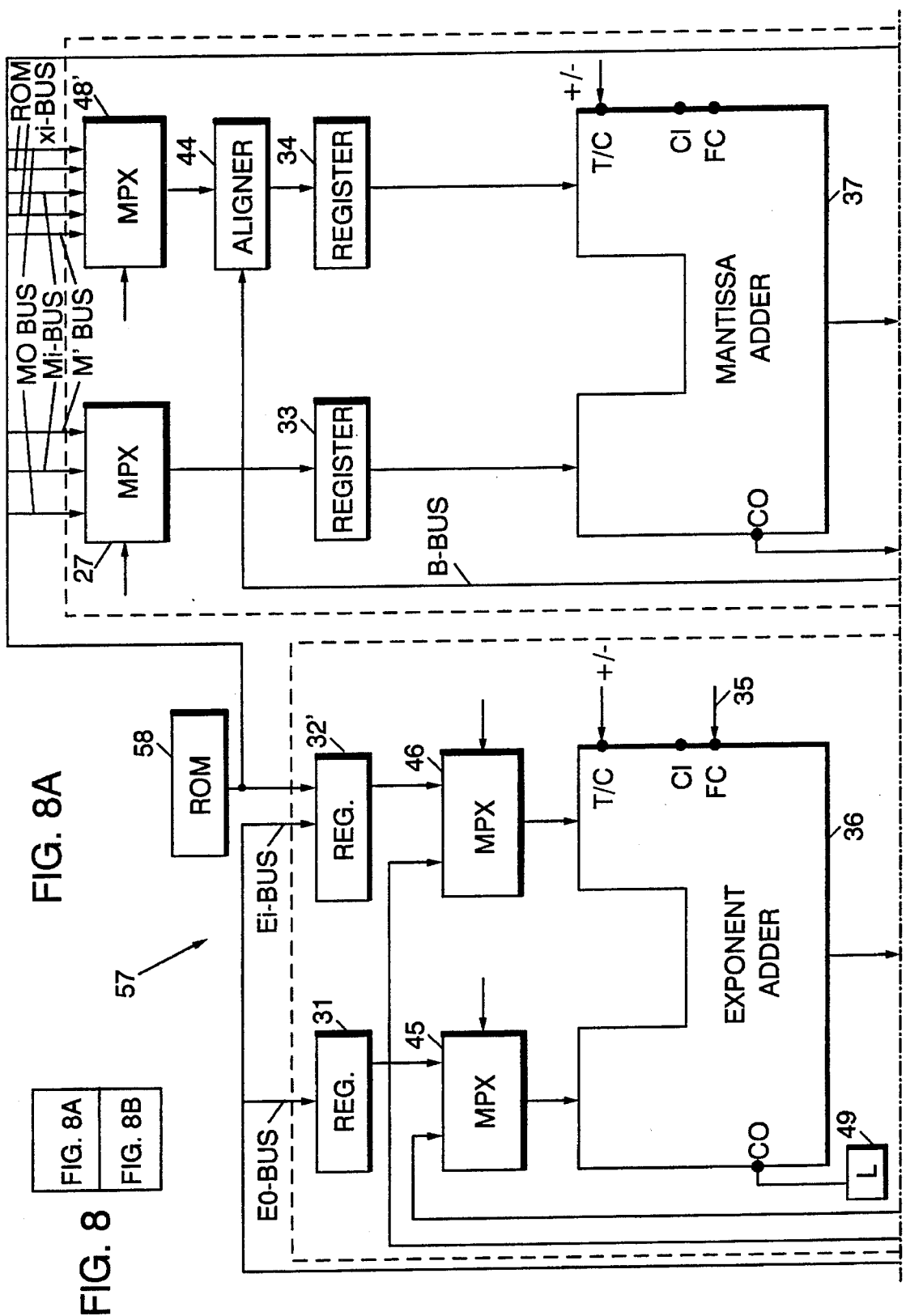
FIG. 8 shows the schematical block diagram of the improved apparatus of the present invention which derives from the apparatus of FIG. 5 once adapted to implement the improved specific algorithm of FIG. 7.
Figure 8B:
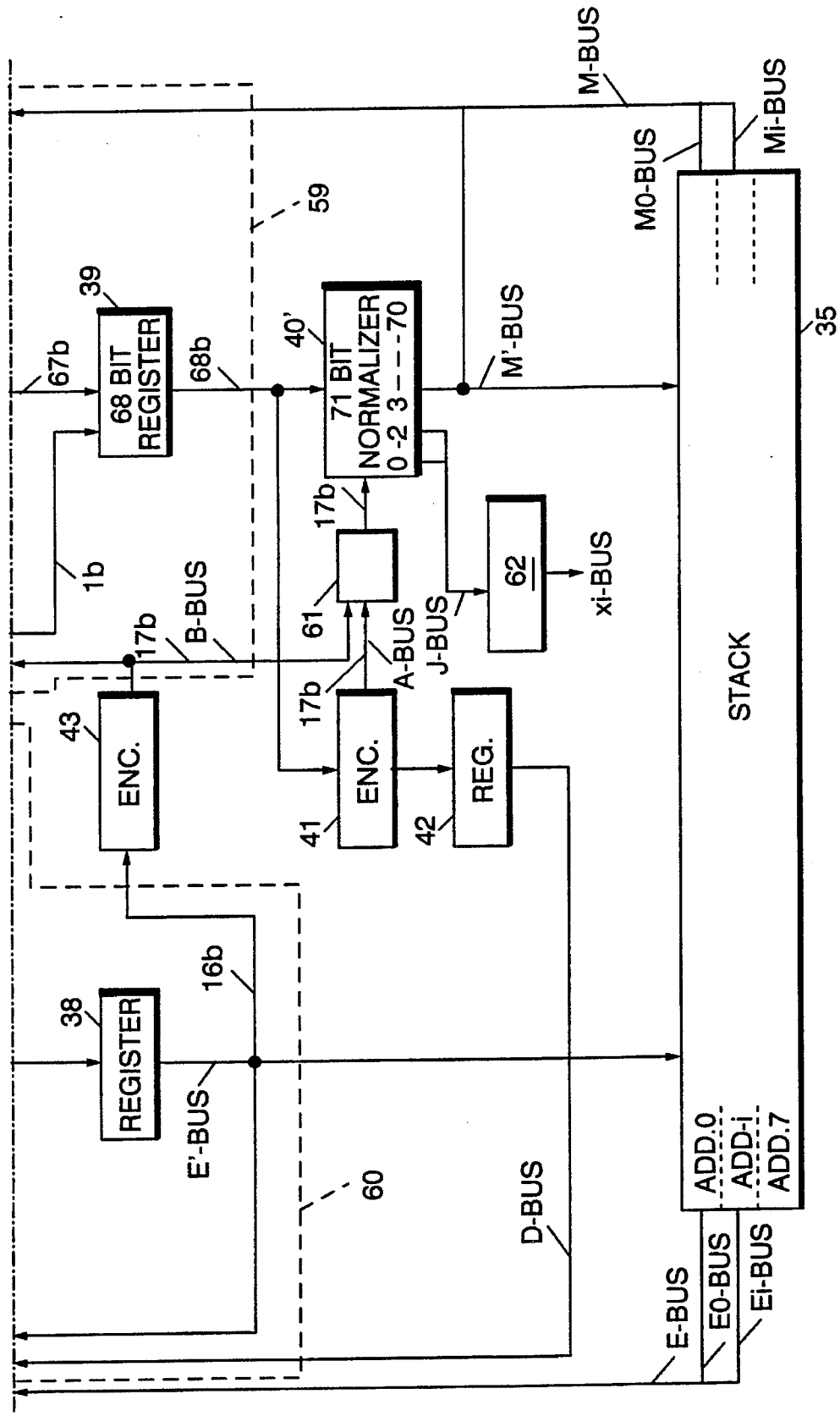

FIG. 8 shows the high performance hardware of FIG. 5 once adapted to incorporate the improved specific algorithm 50 of FIG. 7 for determining the appropriate xi value. With respect to the base hardware architecture of FIG. 5, the same elements bear the same references. The improved hardware of FIG. 8 bears numeral 57. Three pieces of the base hardware of FIG. 5 have been modified.

First, three-way multiplexer circuit 48 is now a five-way multiplexer circuit referenced 48'. It has a novel connection to the output of the constant ROM 58, and a specific input for the 67 bit xi-BUS. Register 32 which was connected to the Ei-BUS has a further connection to the constant ROM 58 and is now referenced 32'. For sake of simplifying the description, the pipeline architecture dedicated to the mantissa will be referred to as a functional block operative to perform pipeline ADD/SUBTRACT COMPARE operations on mantissas and is referenced 59. Likewise, the pipeline architecture dedicated to the exponent will be referred to as a functional block operative to perform pipeline operations on exponents and is referenced 60. In FIG. 5, normalizer 40 has 68 bit positions. Pursuant to the present invention, its width has to be increased by three bits on the left to now support 71 bit positions with their respective inputs forced to zero. As so modified, normalizer 40 is now referenced 40'. These three left-most extra bits J(0:2) which are output by normalizer 40' are required for further processing as mentioned above.

In addition to the constant ROM 58, two other pieces of hardware have been added: a standard two-input selector circuit 61 to control normalizer 40' and a logic circuit 62 that calculates the K(1:2) bits, and then generates the full xi mantissa value according to relations (5) explicitly given above, whose 67 bits constitute the xi-BUS.

Selector circuit 61 operates like a multiplexer. Depending upon the command generated by the control logic, it selects either the output of encoder 43 via the B-BUS or the output of leading zero detector/encoder 41 via the A-BUS, to be applied to normalizer 40'. The three left-most bits J(0:2) of normalizer 40' are applied to logic circuit 62 via the J-BUS.

The extra-hardware of FIG. 8 has therefore an easy implementation and only a minimal silicon area dedicated to the exponential approximation, both from dataflow and control logic circuitry points of view.

Figure 9:
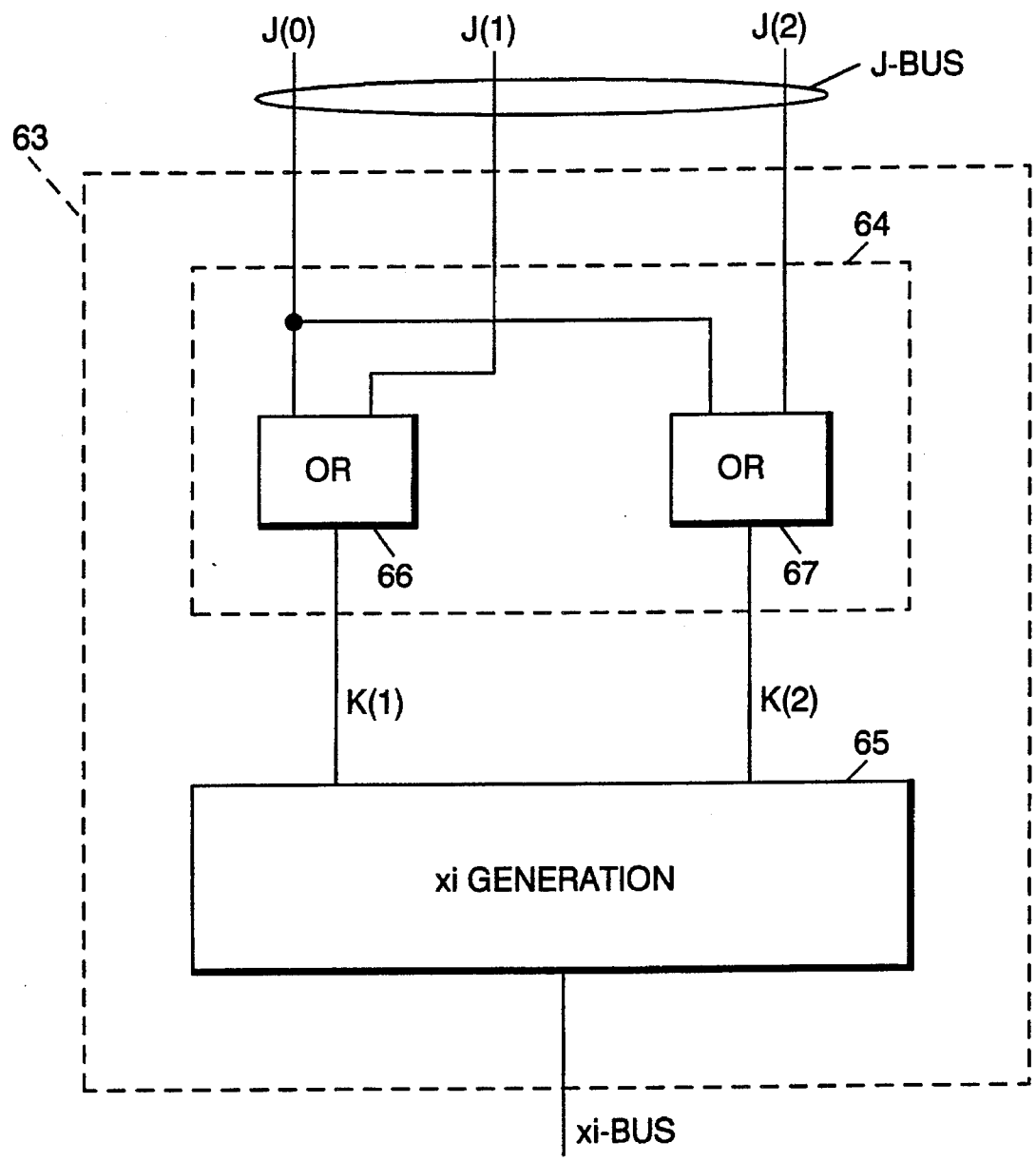
FIG. 9 shows a circuit detail of the apparatus of FIG. 8.

FIG. 9 shows the details of the construction of logic circuit 63 which is basically comprised of blocks 64 and 65. Block 64 includes two 2-way OR logic gates 66 and 67. OR gate 66 is driven by the J(0) and J(1) bits while the OR gate 67 is driven by the J(0) and J(2) bits. Bits J(0), J(1), and J(2), i.e. J(0:2), are generated by normalizer 40' and correspond to the three left-most bits thereof to form the J-BUS as explained above. The outputs of OR gates 66 and 67 are applied to a standard xi generation circuit referenced 65 to feed the xi-BUS.

Figure 10:
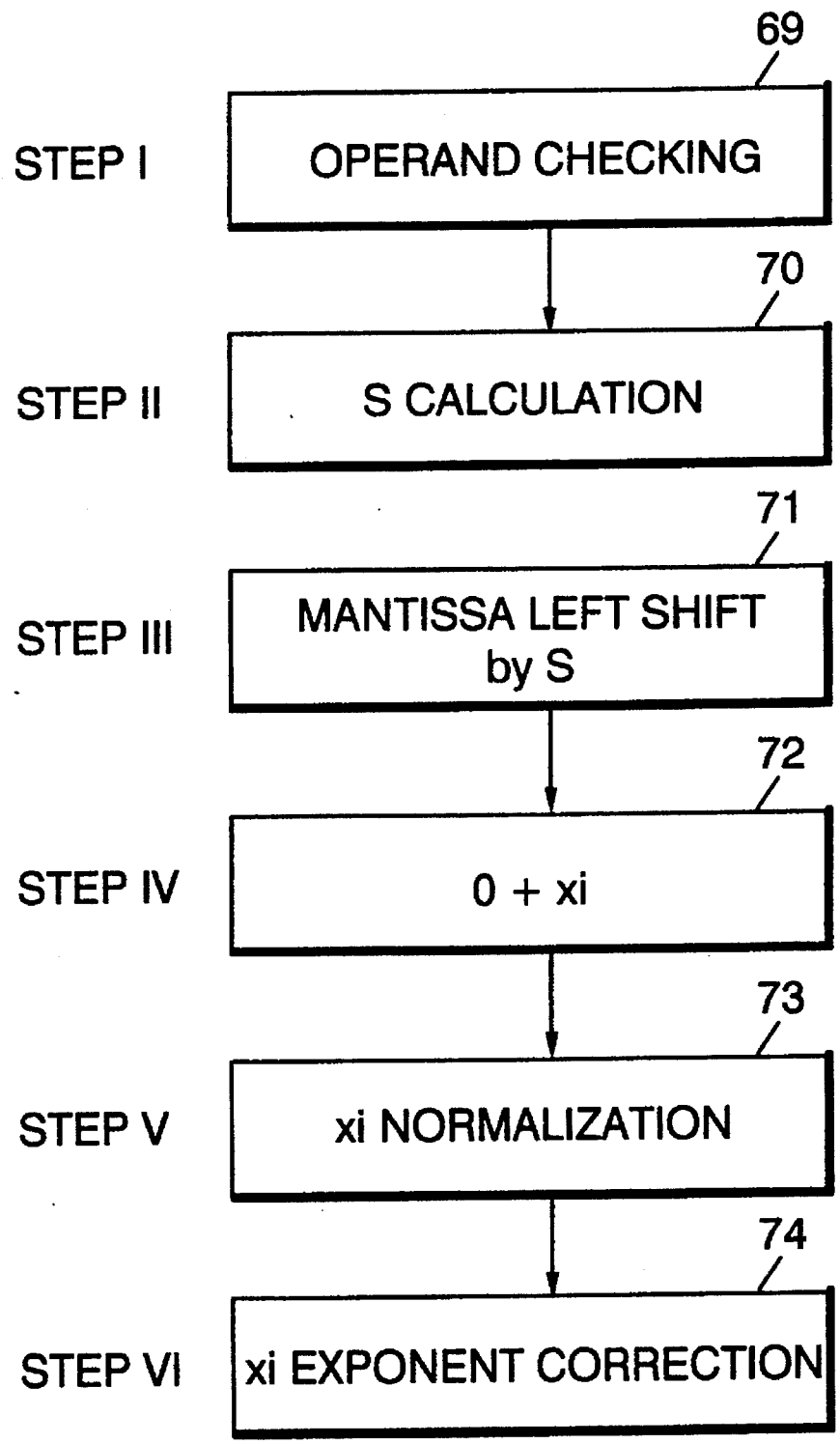
FIG. 10 illustrates the six processing steps that are now required to determine the xi value when using the improved apparatus of FIG. 8.

FIG. 10 shows the process sequence referenced 68 that results from the present invention. The aim is to compute a normalized xi to comply with the IEEE standard format. As explained above, the principle at the base of the present invention is to notice that all the information that is required to define the xi value resides in the three first bits of the x mantissa. The new process sequence is now comprised of six steps referenced I to VI.

Step I (Operand checking)

The preliminary step of operand x checking according to the IEEE standard set of rules (data value, zero, infinity denormalized numbers . . . ) is completed in box 69. The x mantissa and exponent are latched respectively in registers 33 and 31. The exponent of 2**–3 (value=⅛) which was previously stored in the constant ROM 58, is loaded in register 32'.

Step II (S calculation)

In box 70, operation x–⅛ is performed only on the exponent side i.e. S=Exp(x)–Exp(2**–3). The carry out bit (CO) is latched in latch 49 as well as the result in register 38.

Figure 3:
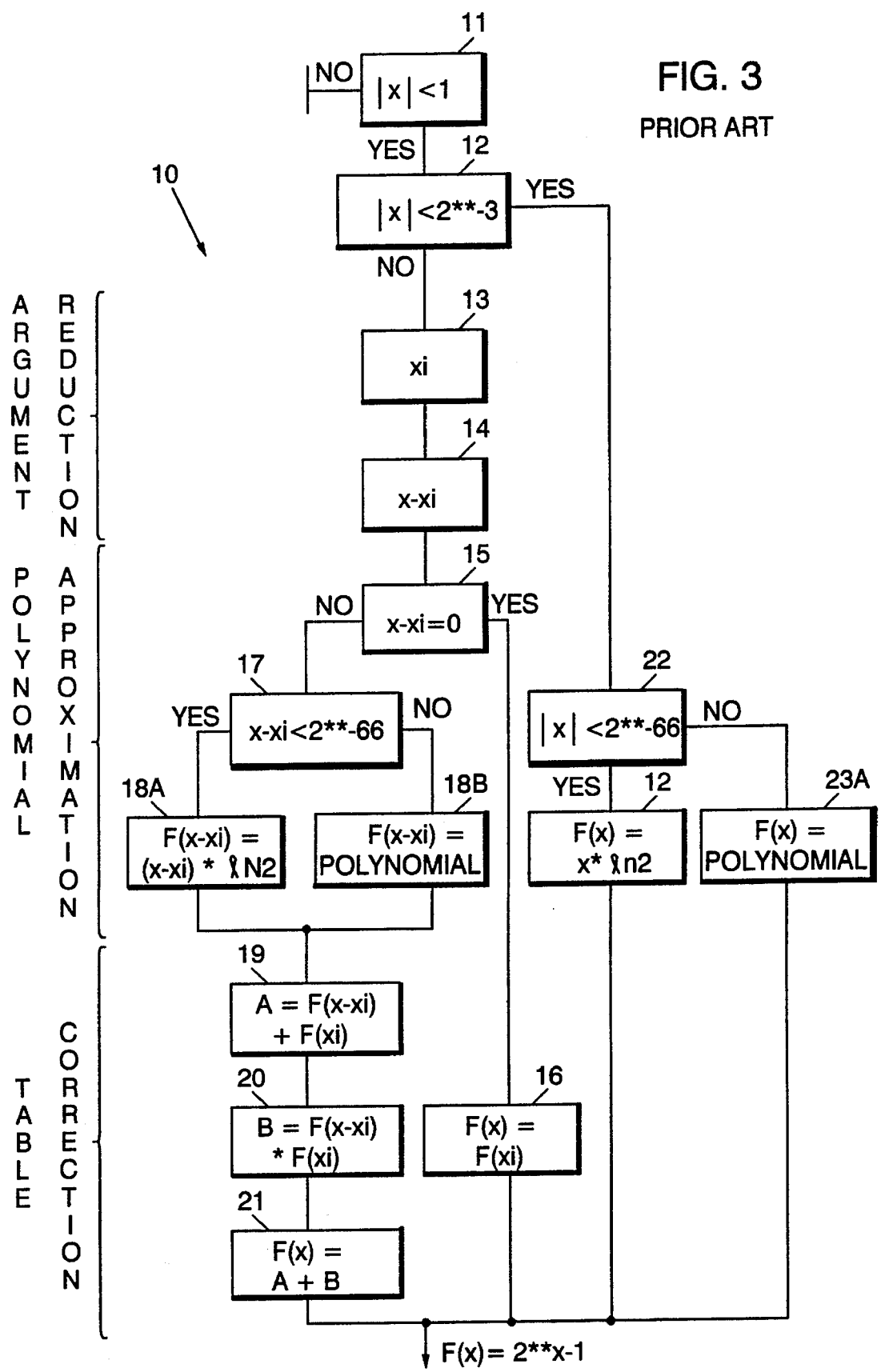
FIG. 3 illustrates a prior art efficient, state of the art, algorithm to evaluate the exponential function over the full (−1, +1) range.

If CO=1, this means, x–⅛ is negative or x<⅛, no argument reduction is thus needed as apparent from algorithm 10 of FIG. 3 (see box 12 with a YES conclusion).

If CO=0, register 38 content gives the number S of bits of the x mantissa which are needed to evaluate xi.

The mantissa adder 37 performs the operation 0+x and latches the result in register 39 for subsequent normalization in normalizer 40'.

Step III (Mantissa left shift by the S value)

According to box 71, normalizer 40' is forced to shift left the output of register 39 by the bit number S memorized in register 38 after encoding in circuit 43. To that end, selector 61 selects the output of encoder 43. The three left-most bits J(0), J(1), J(2) that are output of normalizer 40' will determine the K(1:2) values and then xi as explained above in conjunction with FIG. 7.

The non-normalized xi value is then latched in register 34 through multiplexor 48'. Simultaneously, the corresponding exponent (i.e. "0") is loaded in register 32' from the constant ROM 58.

STEP IV (Completion of operation 0+xi)

The operation 0+xi is performed in box 72 on both exponent and mantissa sides. The two results are latched in registers 38 and 39 respectively to allow subsequent normalization.

STEP V (xi normalization)

The mantissa result stored in register 39 is now normalized by passing through normalizer 40' (box 73). To that end, the leading zero number is first determined, then encoded in encoder 41. The result is latched in register 42 and applied to normalizer 40' via selector circuit 61. Now encoder 41 is selected, to determine the number of leading zeroes of the content of register 39. The result, i.e. the normalized xi value, is latched in register 33.

STEP VI (xi exponent correction)

Exponent correction is performed in box 74 by subtracting the leading zero number latched in register 42 from the content of register 38. The final result i.e. xi exponent is latched in register 38.

This terminates the determination of the xi value subject to box 13 in FIG. 3 in accordance with the improved specific algorithm of FIG. 7. The remaining steps, including determination of (x-xi) and so on, are completed as standard. Those six steps correspond to six elementary machine cycles.

Figure 1:
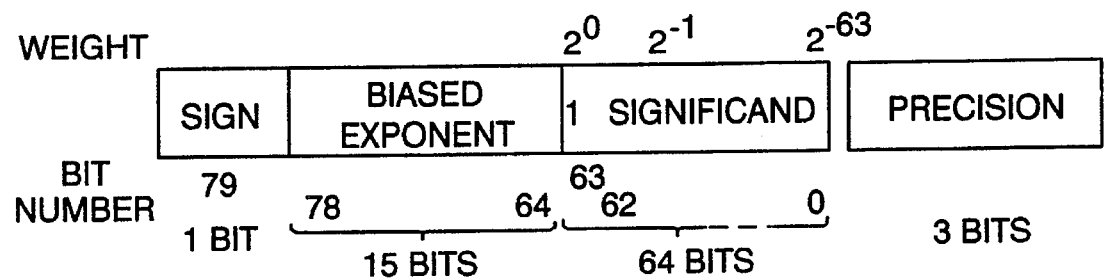
FIG. 1 shows the prior art IEEE standard basic 80-bit double extended precision floating-point format for sake of illustration.
Figure 2:
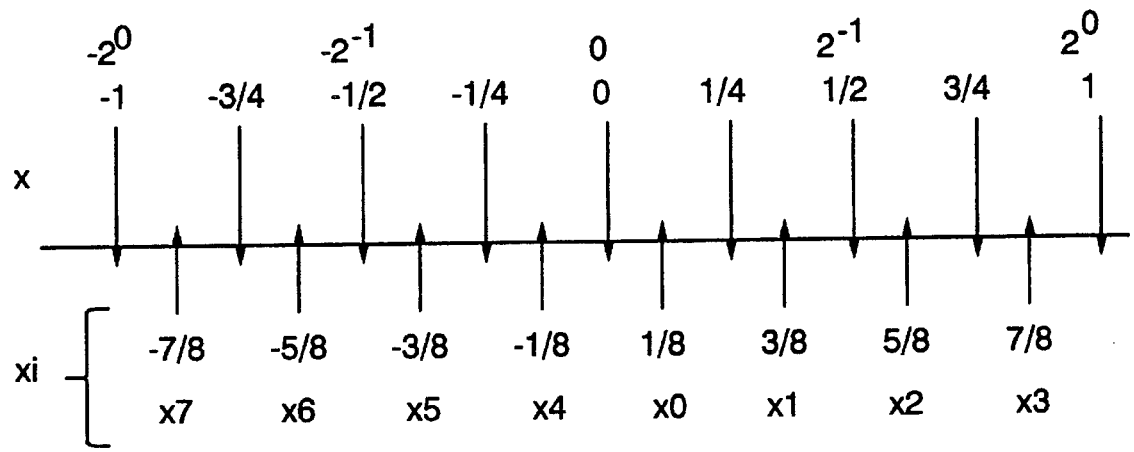
FIG. 2 illustrates the prior art eight xi values needed to evaluate the exponential function according to the argument reduction method.
Figure 4:
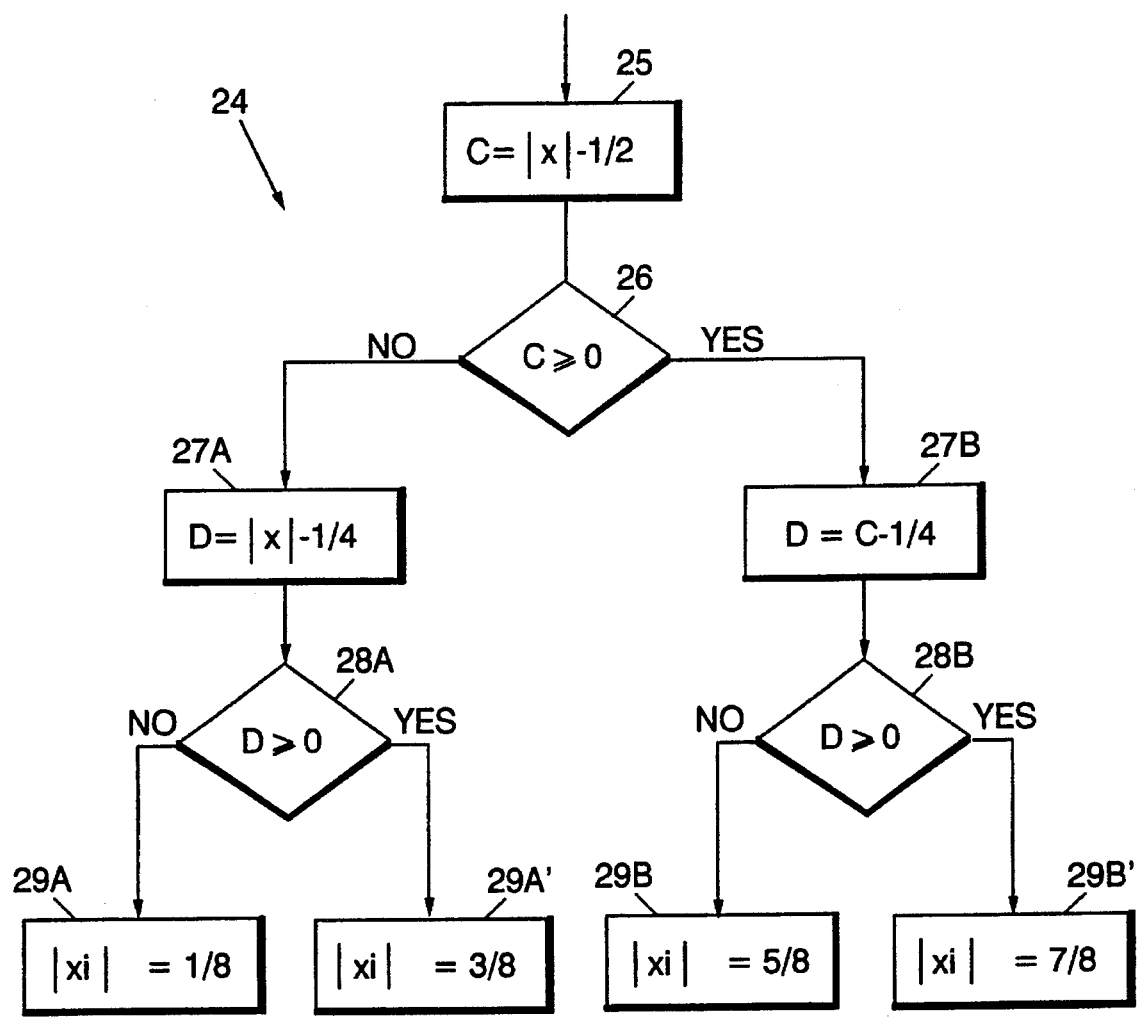
FIG. 4 shows the trivial prior art specific algorithm that can be used to perform the operation of box 13 of the algorithm of FIG. 3, i.e. the determination of the appropriate xi value.

In summary, only one constant value (⅛) has to be stored. Moreover, as apparent from the above, the method and apparatus of the present invention do not depend from the number of xi or F(xi) stored in the constant ROM in terms of cycles. It is a significant difference with the prior art specific algorithm of FIG. 4, where every time the number of xi is doubled, a new constant value needs to be added for the argument reduction and two system cycles as well. Finally, only the size of the normalizer needs to be increased from 68 bit positions to 71 bit positions pursuant to the IEEE format of FIG. 1. Note that the control logic thereof including the J-BUS, . . . , has to be adapted to its new size.

We claim:

1. Apparatus (57) for executing an argument reduction stage in computing the value of an exponential function $F(x)=(2x)-1$, by determining a value of xi and computing (x-xi) according to an IEEE 754 standard representation of floating-point format of a real number having a sign S, an exponent E and a mantissa M, wherein said real number is expressed as $((-1)s))*(1.M)*(2**(E+BIAS))$ with BIAS being a constant added to said exponent E, said apparatus comprising:

a) a first means (59) connected to a xi bus for performing pipeline ADD/SUBTRACT/COMPARE operations on an N bit mantissa by receiving input from a constant ROM and said xi bus, said first means including aligner means (44), a pair of input registers (33,34) one of which is connected to the output of said aligner mean, and mantissa adder (37) which receives an input from each of said pair of input registers and which provides an output to and an N+1 bit output register (39) wherein the most significant bit of said output register is a carry-out bit generated by the mantissa adder (37); the output register (39) is connected to both:

b) an N+4 bit normalizer means (40') for receiving an output from said output register, said normalizer means having its three leftmost input bits tied to "zero" and having it three leftmost output bits J(0:2) output on a three-bit bus (J-BUS); and c) a leading zero detector/encoder means (41) for determining the number Of leading zeros in said output register;

said apparatus further comprising:

d) a second means (60) for performing pipeline operations on exponents and having an output connected to an encoder means (43) whose output controls said aligner means;

e) a selector circuit (61) driven by the outputs of said detector/encoder means (41) and encoder means (43) whose output controls said normalizer means (40'); and, f) a xi determining circuit (62), connected to the output of normalizer means (40') by said three-bit bus, that calculates bits K(1) and K(2) from bits J(0:2) such that:

K(1)=J(0) or J(1)

K(2)=J(0) or J(2)

and generates the xi mantissa on the xi-BUS connected to said first means such that:

mantissa xi=0 K(1) K(2) 10 . . . . . 0.

2. The apparatus of claim 1 further comprising:

g) ROM means (58) for storing a plurality of F(xi) values representing polynomials necessary to reach a specific relative error, whose output is connected to inputs of said first means and second means for the respective mantissa and exponent parts of each F(xi).

3. The apparatus of claim 1 or 2 wherein said xi determining circuit (62) is comprised of:

a first OR logic gate (66) connected to the J(0) and J(1) bits of the normalizer means a second or logic gate (67) connected to the J(0) and J(2) bits of the normalizer means a xi generation circuit (65) driven by the respective output of said first and second OR logic gate whose output forms the xi-BUS.

* * * * *